United States Patent
Nußbaumer et al.

(10) Patent No.: US 12,244,478 B2
(45) Date of Patent: Mar. 4, 2025

(54) SAFE TEST ARRANGEMENT

(71) Applicant: OMICRON ELECTRONICS GMBH, Klaus (AT)

(72) Inventors: Roland Nußbaumer, Dornbirn (AT); Thomas Blocher, Feldkirch (AT); Matthias Kukuk, Lauterach (AT)

(73) Assignee: OMICRON ELECTRONICS GMBH, Klaus (AT)

( * ) Notice: Subject to any disclaimer, the term of this patent is extended or adjusted under 35 U.S.C. 154(b) by 415 days.

(21) Appl. No.: 17/769,539

(22) PCT Filed: Oct. 16, 2020

(86) PCT No.: PCT/EP2020/079201
§ 371 (c)(1),
(2) Date: Apr. 15, 2022

(87) PCT Pub. No.: WO2021/074373
PCT Pub. Date: Apr. 22, 2021

(65) Prior Publication Data
US 2023/0026165 A1   Jan. 26, 2023

(30) Foreign Application Priority Data

Oct. 18, 2019   (AT) .............................. A 50898/2019

(51) Int. Cl.
*H04L 12/66* (2006.01)
*H04L 12/40* (2006.01)
(Continued)

(52) U.S. Cl.
CPC .... *H04L 43/0805* (2013.01); *H04L 12/40019* (2013.01); *H04L 2012/421* (2013.01)

(58) Field of Classification Search
CPC . H04L 43/50; H04L 12/40078; H04L 12/437; H04L 43/00; H04L 49/555;
(Continued)

(56) References Cited

U.S. PATENT DOCUMENTS 7,840,713 B2   11/2010   Schroff et al.
8,234,427 B2   7/2012   Büttner et al.
(Continued)

FOREIGN PATENT DOCUMENTS

CN         202362658      8/2012
DE    10 2006 046 841    4/2008
(Continued)

OTHER PUBLICATIONS

Australia Search Report conducted in counterpart Australia Appln. No. 2020365435 (Jan. 25, 2023).
(Continued)

*Primary Examiner* — Kharye Pope
(74) *Attorney, Agent, or Firm* — GREENBLUM & BERNSTEIN, P.L.C.

(57) ABSTRACT

A flexible test arrangement for performing measurements on a test object. A plurality of safety components, each having a safety module which can be set to active or inactive, and having a ready status which can be set to active or inactive, is provided in a circular test arrangement. Each of the safety components carries out a number of function tests cyclically. As one of the function tests, a cyclical, error-free reception of a data packet is tested. One of the safety components is selected as a bus master which cyclically transmits a bus verification signal in a data packet to the safety component which is adjacent in the direction of transmission, wherein the bus verification signal is relayed by each of the safety components in a data packet, and, when said bus verification
(Continued)

signal is received in a data packet, the bus master determines that the circular test arrangement is closed.

10 Claims, 4 Drawing Sheets

(51) Int. Cl.
  *H04L 12/42* (2006.01)
  *H04L 43/0805* (2022.01)
(58) Field of Classification Search
  CPC .... G06F 30/33; G06F 30/3308; G06F 30/333; G06F 30/30
  USPC ........................................ 370/241, 222, 249
  See application file for complete search history.

(56) References Cited

U.S. PATENT DOCUMENTS

| | | | |
|---|---|---|---|
| 8,279,751 B2 | 10/2012 | Kerber et al. | |
| 8,842,747 B2 | 9/2014 | Willms | |
| 9,172,647 B2 | 10/2015 | Chew et al. | |
| 10,182,001 B2 | 1/2019 | Bruckner et al. | |
| 10,605,867 B2 | 3/2020 | Jochum et al. | |
| 2008/0080490 A1* | 4/2008 | Ito | H04L 12/42 370/362 |
| 2009/0292845 A1* | 11/2009 | Buttner | H04L 12/437 710/110 |
| 2010/0246408 A1* | 9/2010 | Kerber | H04L 12/437 370/242 |
| 2013/0148753 A1* | 6/2013 | Willms | H04L 12/423 375/259 |
| 2014/0321285 A1* | 10/2014 | Chew | H04L 43/10 370/236 |
| 2017/0055307 A1 | 2/2017 | Cao et al. | |
| 2017/0353491 A1 | 12/2017 | Gukal et al. | |
| 2018/0238967 A1 | 8/2018 | Jochum et al. | |
| 2019/0335024 A1* | 10/2019 | Hummen | H04L 43/067 |

FOREIGN PATENT DOCUMENTS

| | | | | |
|---|---|---|---|---|
| DE | 10 2006 055 887 | | 5/2008 | |
| DE | 10 2017 130 167 | | 6/2018 | |
| DE | 10 2017 209 309 | | 12/2018 | |
| EP | 2 439 885 | | 4/2012 | |
| EP | 2439885 A1 * | | 4/2012 | ....... H04L 12/40163 |
| EP | 3 151 476 | | 4/2017 | |
| KR | 10-0490877 | | 5/2005 | |
| RU | 2 604 633 | | 12/2016 | |
| WO | 2009/043868 | | 4/2009 | |
| WO | WO-2009043868 A1 * | | 4/2009 | ........... H04L 12/437 |
| WO | 2016/055307 | | 4/2016 | |

OTHER PUBLICATIONS

Austria Search Report conducted in counterpart Austria Appln. No. A 50898/2019 (Oct. 1, 2020).
Int'l Search Report (Form PCT/ISA/210) conducted in Int'l Appln. No. PCT/EP2020/079201 (Jan. 19, 2021).
Int'l Written Opinion (Form PCT/ISA/237) conducted in Int'l Appln. No. PCT/EP2020/079201 (Jan. 19, 2021).
Int'l Prelim. Exam. Report (Form PCT/IPEA/409) conducted in Int'l Appln. No. PCT/EP2020/079201 (Apr. 21, 2022).
Russia Search Report/Office Action conducted in counterpart Russia Appln. No. A 50898/2019 (Dec. 6, 2022).

* cited by examiner

SAFE TEST ARRANGEMENT

The present invention relates to a method for operating a test arrangement comprising a plurality of safety components, wherein the safety components each have a signal input for receiving data packets and a signal output for transmitting data packets, wherein the safety components each have a safety module which can be set to active or inactive, and have a ready status which can be set to active or inactive, wherein the safety module of a safety component is set to inactive if the ready status of the associated safety component is set to inactive.

A test device can be used to perform measurements on dangerous test objects, such as current transformers. Because a dangerous test object can store a dangerous amount of energy, adequate safety precautions must be taken when performing measurements. For this reason, the test device can be expanded to a test arrangement with additional components. For example, a hazardous work area can be provided with warning lights and emergency stop switches as components. Emergency stop switches can enable current and voltage amplifiers in the test device to be switched off quickly and safely. Warning lamps, on the other hand, can indicate, for example, whether the test object or the work area is safe (discharged) or unsafe (live). A lockout feature for the testing device can be provided as a further component in order to prevent switching on without authorization. Activating a lockout feature can be an important safety aspect, especially when a person is working on the cabling. A test arrangement usually includes a number of components, including test devices, warning lamps, emergency stop switches, lockout features, etc.

One way to set up such a test arrangement is to use a safety circuit with discrete signals. The components of the test arrangement are connected to one another via a safety field bus, with the components communicating via securely implemented signals. For this reason, safety fieldbuses are configured and tested by the manufacturer. For safety reasons, the user cannot and must not change the safety fieldbus. For this reason, it is not possible for the user to integrate additional components into the test arrangement, or to transmit additional information—for instance, for diagnostic purposes. Therefore, in addition to high safety standards with regard to communication between the components, it is also desirable for all components to have a long service life. Since the components are fixed to one another, there is a great deal of effort involved in the cabling. Furthermore, the process of detecting and avoiding errors in the cabling (cable break, short circuit, crosstalk, etc.) is very complex. These problems are known in the prior art. DE 10 2017 130167 A1 describes a method for detecting network connection failures, focusing on a secure transmission of test data via these network connections. DE 10 2017 130167 A1 only addresses, as is the case in general in the prior art, the network subscribers and/or components themselves, and their individual verifications, to a limited degree.

It is therefore an object of the present invention to specify a flexible test arrangement for carrying out measurements on a test object.

This object is achieved in that the signal inputs and signal outputs of the safety components are connected in such a way that the safety components form a circular test arrangement with a direction of transmission for the data packets, wherein the safety components each cyclically perform a number of function tests, and set their ready status to active if the number of function tests is successful, and to inactive if at least one of the function tests fails, wherein, as one of the function tests, a cyclic, error-free reception of a data packet is checked. One of the safety components is selected as the bus master, which cyclically transmits a bus verification signal in a data packet to the safety component which is adjacent in the direction of transmission, wherein the bus verification signal is forwarded by each of the safety components in a data packet, and the bus master, upon receiving the bus verification signal in a data packet, determines that the circular test arrangement is closed.

The circular test arrangement thus forms a ring bus which comprises the safety components. The signal outputs of the safety components are each connected in a ring to the signal inputs of the further safety components, such that the test arrangement has exactly one direction of transmission for the transmission of data packets. In order to check whether the circular test arrangement is closed, one of the safety components is designated as the bus master. The bus master cyclically transmits a bus verification signal in a data packet via the safety components of the test arrangement, with the individual safety components each forwarding the bus verification signal in a data packet. If the bus verification signal arrives again at the bus master, it can determine that the test arrangement is closed. The cycle time for transmitting data packets is preferably 10 ms to 100 ms, although shorter cycle times improve the response time, particularly in the event of a failed function test.

Whether or not the safety component actually has an active readiness state depends on the type of safety component and the corresponding function tests.

In contrast to prior art safety buses, the transmission of the data packets between the safety components themselves does not have to be secure. Instead, the safety components carry out a number of function tests, wherein at least one essential function test takes place in the form of a check for a cyclic, error-free reception of a data packet. In addition to this function test, further function tests can be carried out. The ready status of each of the respective safety components is only set to active if all function tests are successful. If one or more of the function tests fails, the ready status of the safety component is set to inactive. Such a communication link between the safety components is referred to as what is known as a "black channel," which means that the communication between the safety components is not regarded as functionally secure.

If a closed circular test arrangement is determined, the bus master preferably checks cyclically whether its ready status is active and, if the ready status is active, transmits a ready signal in a data packet to the adjacent safety component in the direction of transmission, wherein the safety components check whether their ready status is active when they receive the ready signal, and in the case of an active ready status, transmit a ready signal in a data packet to the safety component which is adjacent in the direction of transmission.

If the bus master determines that the circular test arrangement is closed, by receiving the bus verification signal, and if its ready status is active, the bus master transmits a ready signal to the adjacent safety component in the direction of transmission, i.e., to the safety component whose signal input is connected to the signal output of the bus master. This safety component receives the ready signal and checks its own ready status. If its ready status is active, this safety component transmits the ready signal in a data packet to the adjacent safety component in the direction of transmission, etc. In contrast to the bus verification signal, the ready signal is not necessarily forwarded in the data packets to the bus master when the circular test arrangement is closed—only if all safety components actually have an active ready status.

Upon receipt of the ready signal, the bus master preferably determines that the test arrangement is ready for operation, and transmits an activation signal in a data packet to the safety component which is adjacent in the direction of transmission, wherein the safety components activate their safety module upon receipt of an activation signal, and forward the activation signal in a data packet.

If all safety modules are active, then the test arrangement is activated, and safety-relevant information can be exchanged by the safety components. Safety-relevant information is information that is required to carry out the measurement in the test setup.

The test arrangement thus only offers a functionally secure communication channel for transmitting and receiving safety-relevant information if all safety components have an activated safety module. If this is the case, a summary of all safety components in the test arrangement can also be provided as safety-relevant information between the safety components.

The safety components can include, for example, output units for outputting safety-relevant information, input units for inputting safety-relevant information, power units for inputting/outputting safety-relevant information, etc. However, a safety component can only read safety-relevant information from data packets and/or write it to data packets if a safety module of a safety component is active.

For example, enabling units for enabling the test arrangement, or key switches for securing the test arrangement against unauthorized persons, can be provided as input units. Likewise, blocking units, such as emergency stop switches for deactivating individual or all safety components or their functions, can be provided as input units. Likewise, start switches can be provided for the final enabling of the measurement by the test arrangement.

Power units such as current amplifiers, voltage amplifiers, and "switch boxes" which switch off dangerous voltages/currents, etc. can be provided in safety components. If the safety module is inactive, it must be ensured that the power units are switched off.

Warning lamps or display units for measured values can be provided as output units, with a warning color (e.g. red) being displayed for an active power unit and a standby color (e.g. green) being displayed for a de-energized power unit.

A safety component may include one or more output units, input units, power units, or a combination thereof.

For example, a safety component can trigger an emergency stop on the basis of received safety-relevant information in a data packet. This emergency stop is again transmitted as safety-relevant information in a data packet, with another safety component reading out this safety-relevant information and displaying a warning light. A further safety component can, for example, deactivate its power unit. A dangerous state of a power unit of a safety component can also be transmitted as a data packet as safety-relevant information, and can in turn be read out and output. For example, the definition of "hazard" in the IEC 61508 standard, preferably in Edition 2.0, or the ISO 13849 standard, preferably in the ISO 13849-1:2015, ISO 13849-2:2012 version, can be regarded as dangerous.

After a ready signal has been transmitted and when a ready signal is not received, the bus master preferably transmits an emergency stop signal in a data packet to the safety component which is adjacent in the direction of transmission, and the safety components deactivate their safety module each time the emergency stop signal is received, and forward the emergency stop signal in a data packet. If the bus master does not receive its ready signal back within the scheduled cycle, it concludes that at least one safety component has an inactive ready status. Subsequently transmitting an emergency stop signal can ensure that all safety modules of all safety components are also inactive.

After a bus verification signal has been transmitted, and if a bus verification signal is not received, the bus master preferably transmits an emergency stop signal in a data packet to the safety component which is adjacent in the direction of transmission, and the safety components deactivate their safety module upon receipt of the emergency stop signal, and forward the emergency stop signal in a data packet. In this way, in particular in the event of a break in the ring, and of a configuration of the safety components in which they always transmit a data packet even if they do not receive a data packet, it can be ensured that all safety modules are actually deactivated.

The safety components preferably carry out a safety test and, if the safety test fails, deactivate their ready status and transmit an emergency stop signal in a data packet to the safety component which is adjacent in the direction of transmission, wherein the safety components deactivate their safety module upon receipt of the emergency stop signal, and transmit the emergency stop signal in a data packet. During the safety test, functions of the safety components that are safety-critical are checked. If the safety test fails, the ready status, and thus also the safety module, are deactivated immediately, and a data packet with an emergency stop signal is also transmitted immediately in order to deactivate all other safety modules of all other safety components as quickly as possible.

The bus master is preferably selected via a component identification of the safety components. The safety component with the lowest component identifications is preferably selected as the bus master.

The safety components can transmit a component identification with the bus verification signal in the data packet, with the bus master identifying the safety components by the component identifications received with the bus verification signal.

The bus master preferably transmits the component identifications back to the respective safety components in a data packet, with a safety component setting its ready status to inactive if it does not receive its identification back from the bus master.

The bus verification signal, the ready signal, the activation signal, the emergency stop signal, etc. can be transmitted by the bus master in the same data packet, or in individual data packets. If the bus verification signal and the ready signal are transmitted in one data packet, then, when the bus master receives the ready signal in the data packet, it can be determined that the circular test arrangement is still closed. Only if the data packet also contains a ready signal when it is received by the bus master can the bus master determine that all safety components have an active ready status.

If the safety modules are active, the safety-relevant information can also be transmitted via the same data packet—such as the bus verification signal, the ready signal, the activation signal, the emergency stop signal, etc.

In the following, the present invention is described in greater detail with reference to FIGS. 1 to 6, which show, by way of example, schematic and non-limiting advantageous embodiments of the invention. In the drawings.

Figure 1:
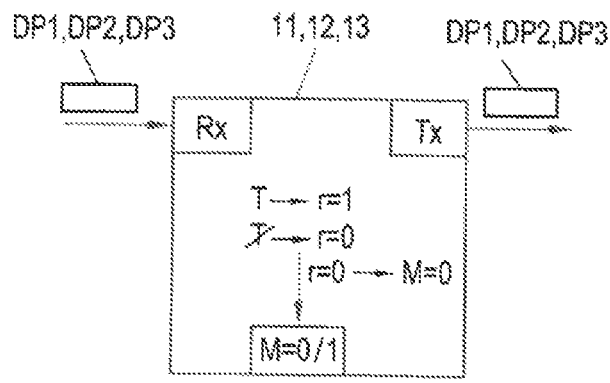
FIG. 1 is a safety component.

A safety component 11, 12, 13 is shown in FIG. 1. The safety component 11, 12, 13 has a signal input Rx for receiving data packets DP1, DP2, DP3 and a signal output Tx for transmitting data packets DP1, DP2, DP3, The safety component 11, 12, 13 also has a ready status r, which can be set to active or inactive. The safety component 11, 12, 13 includes a safety module M, which can be set to active or inactive, but is always set to inactive when the ready status is inactive. However, this does not mean that the safety module M always has to be set to active when the ready status r is active.

The safety component 11, 12, 13 carries out at least one function test T cyclically. If all function tests T are successful, the ready status r is set to active. If only one function test T fails, the ready status r is set to inactive, which means that the safety module M is also set to inactive, or remains inactive if it was already inactive.

In the figures shown, an active ready status r, as well as an active safety module M, is represented in general as "1," and an inactive ready status r, as well as an inactive safety module M, is represented in general as "0." A failed function test T is shown as a crossed-out. T: if the function test T is successful, it is shown as a T.

Figure 2:
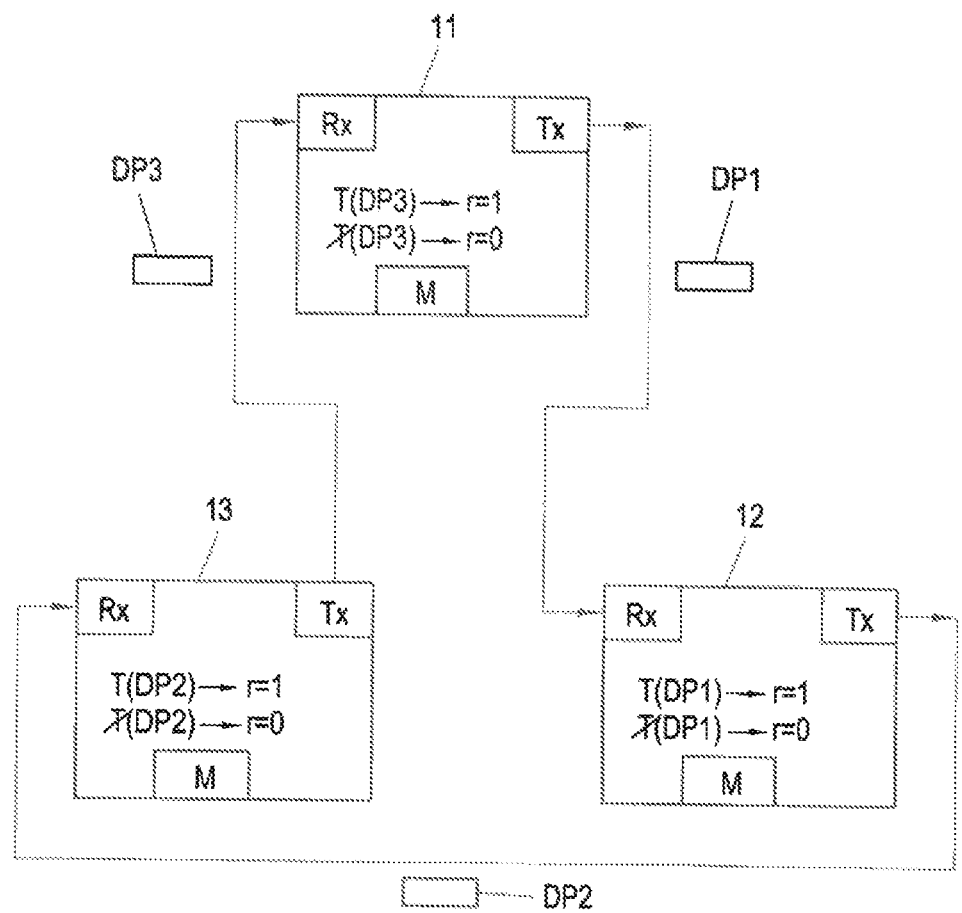
FIG. 2 is a test arrangement comprising three safety components.

FIG. 2 shows the construction of a test arrangement made up of a plurality of safety components 11, 12, 13 as described with reference to FIG. 1. The safety components 11, 12, 13 are connected to one another as a circular test arrangement in the form of a ring bus, by connecting a signal input Rx of a safety component 11, 12, 13 to a signal output Tx of another safety component 11, 12, 13. In FIG. 2, for example, the signal output Tx of the first safety component 11 is connected to the signal input Rx of the second safety component 12, the signal output Tx of the second safety component 12 is connected to the signal input Rx of the third safety component 13, and the signal output Tx of the third safety component 13 is connected to the signal input Rx the first safety component 11.

Of course, the number three for the number of safety components 11, 12, 13 is only selected as an example in the drawings shown; the test arrangement can include any number of safety components 11, 12, 13.

As a function test T, the safety components 11, 12, 13 carry out at least one check of a cyclic, error-free reception of a data packet. DR This can be done, for example, via a checksum check, a sequence check, a timeout, etc. This check for error-free reception of the data packets DP establishes a so-called black channel between the safety components 11, 12, 13.

If all function tests T of a safety component 11, 12, 13 are successful in a current cycle, the ready status r of this safety component 11, 12, 13 is set to active, if it is not already active. If the safety module M and the ready status r were already set to active, the safety module M remains activated—unless another security precaution deactivates the safety module M. In FIG. 2, only the essential function test T(DP1), T(DP2), T(DP3) of a check for the cyclic, error-free reception of a data packet DP is provided on one of the safety components 11, 12, 13. If this function test T(DP1), T(DP2), T(DP3) fails, the respective ready status r is set to inactive; if the function test T(DP1), T(DP2), T(DP3) is successful—which in this case means that "all" function tests T for each safety component 11, 12, 13 are successful, because this is the only function test T provided—the ready status r is set to active.

Figure 3:
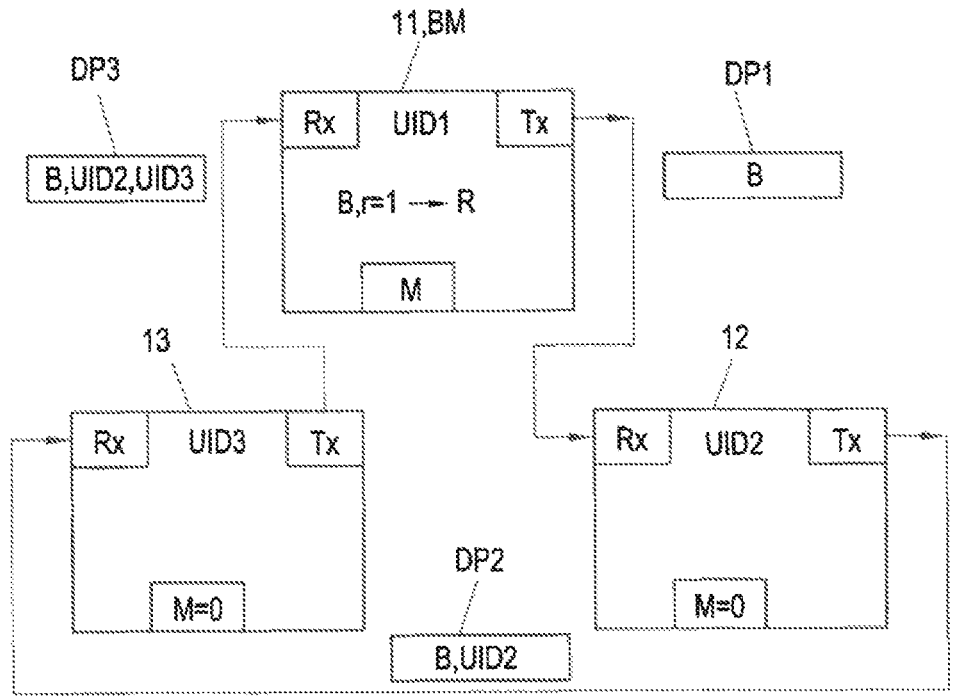
FIG. 3 is the transmission of a bus verification signal.

According to the invention, one of the safety components 11, 12, 13 is also selected as the bus master BM, wherein the bus master BM can be selected using a component identification, such as an identification number UID, of the safety components 11, 12, 13. For example, that safety component 11, 12, 13 with the lowest identification number UID can be selected. In FIG. 3, the first safety component 11 with the UID1 is selected as the bus master BM, by way of example. According to the invention, the bus master BM checks whether the safety components 11, 12, 13 actually form a circular test arrangement—that is, a ring bus. To do this, the bus master BM transmits a bus verification signal B in a data packet DP1 to the safety component which is adjacent in the direction of transmission, in this case the second safety component 12. If there is a connection between the safety components 11, 12, 13, the bus verification signal B is received via the signal input Rx in a data packet DP1, DP2, DP3, and forwarded via the signal output Tx, by all safety components 11, 12, 13 present in the ring bus.

Since each safety component 11, 12, 13 thus expects a periodic data packet DP1, DP2, DP3 (with a bus verification signal B), an (essential) function test T can be to check that this data packet DP is received cyclically without errors. If the data packet DP1, DP2, DP3 is not received as expected, or if the error check and thus the (essential) function test T fail, the respective safety components 11, 12, 13 deactivate their ready status r.

In this case, the safety component 11, 12, 13 can optionally also transmit an emergency signal N in a data packet DP1, DP2, DP3, which is forwarded by all safety components 11, 12, 13 in a data packet DP1, DP2, DP3, and all safety components 11, 12, 13 that receive the emergency signal deactivate their safety module M, which represents a further security mechanism.

In FIG. 3, the first safety component 11 as bus master BM thus transmits the bus verification signal B via its signal output Tx in a data packet DP1 to the signal input Rx of the second safety component 12. The second safety component 12 transmits the bus verification signal B in a data packet DP2 via its signal output Tx to the signal input Rx of the third safety component 13, and the third safety component 13 further transmits the bus verification signal B in a data packet DP3 via its signal output Tx to the signal input Rx of the first safety component 11, which represents the bus master BM. Of course, the bus master BM only receives the bus verification signal B when the ring bus is closed. It can thus be ensured by the bus master BM, by receiving the bus verification signal B, that the ring bus is closed.

The safety components 11, 12, 13 are advantageously designed in such a way that they each transmit their identification number UID1, UID2, UID3 with the bus verification signal B in the data packet, as also shown in FIG. 3. Correspondingly, the bus master BM can be designed to identify the safety components 11, 12, 13 using the identifications UID1, UID2, UID3 received with the bus verification signal B. As shown in FIG. 3, the second safety component 12 receives the bus verification signal B with the data packet DP1 from the bus master BM, adds its identification number UID2, and transmits the data packet DP2 with the bus verification signal B to the third safety component 13. This in turn adds its identification number UID3 and transmits the bus verification signal B in a data packet DP3 to the first safety component 11, which constitutes the bus master BM. In the data packet DP with the bus verification signal B, the bus master BM not only receives the information that the ring bus is closed, but also the identification numbers UID2, UID3 of the other safety components 12, 13; the bus master BM already knows its own identification number UID1. The safety components 11, 12, 13 in the test arrangement are therefore known to the bus master BM via their identification numbers UID1, UID2, UID3.

The safety components 11, 12, 13 continue to carry out cyclical function tests T, and in any case at least the essential function test T, by checking for a cyclic, error-free reception of data packets (DP1, DP2, DP3). The function tests T are not shown in FIGS. 3 to 5 for reasons of clarity.

Likewise, the bus master BM continues to carry out a check for a closed circular test arrangement by transmitting a bus verification signal B.

The bus master BM could now also transmit the respective identification numbers UID2, UID3 back to the respective safety components 12, 13 (not shown). In this way, each safety component 11, 12, 13 can itself check whether the ring bus is actually closed. The safety components 12, 13 can preferably be configured in such a way that they set their ready status r to inactive if they do not receive their identification number UID2, UID3 back from the bus master BM, since this indicates an error in the ring bus.

Figure 4A:
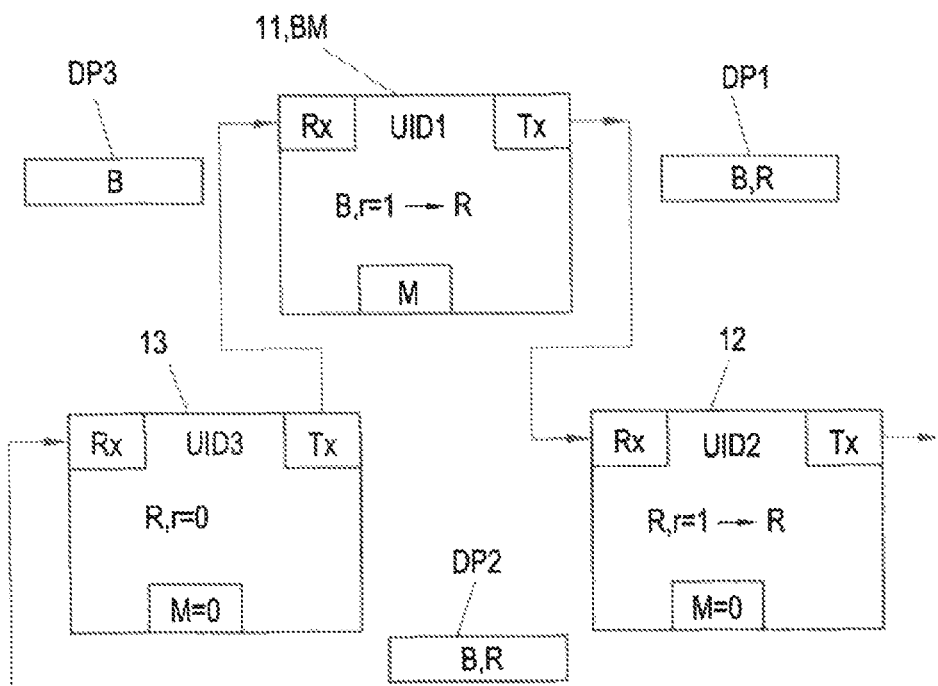
FIG. 4a is a transmission of a ready signal, wherein a safety component has an inactive ready status.

If the bus master BM receives the bus verification signal B via its signal input Rx (which establishes that the ring bus is closed), and if the ready status r of the bus master BM is active, the bus master BM transmits a ready signal R in the data packet DP via its signal output Tx to the adjacent safety component 12 in the direction of transmission (in this case, the second), as shown in FIG. 4a, b. Upon receiving a data packet DP1, DP2, DP3 with a ready signal R, each safety component 11, 12, 13 checks whether its ready status r is active. If the ready status r is inactive, each respective safety component 11, 12, 13 does not transmit a ready signal R in the data packet DP1, DP2, DP3. However, if a safety component 11, 12, 13 receives a ready signal R in the data packet DP and if its ready status r is active, the safety component 11, 12, 13 also transmits a ready signal R via its signal output Tx in a data packet to the signal input Rx of the safety component 11, 12, 13 connected to it.

In FIG. 4a it is assumed that the third safety component 13 has an inactive ready status r. The ready signal R is thus routed in a data packet DP1 from the bus master BM to the second safety component 12. Since the second safety component 12 has an active ready status r, it forwards the ready signal R to the third safety component 13 in a data packet DP2. However, the third safety component 13 has an inactive ready status r, and therefore does not forward the ready signal R in the data packet DP3 to the first safety component 11 (in this case, the bus master BM). The bus master BM thus concludes that not all safety components have an active ready status r=1.

If the bus master BM does not receive the ready signal R, it advantageously transmits an emergency stop signal N in a data packet DP1 (not shown), which is forwarded by the safety components 11, 12, 13. Upon receipt of the emergency stop signal N, the safety components 11, 12, 13 switch their safety module M to inactive, if it is not already inactive. This provides an additional safety precaution, and ensures that all safety modules M are inactive.

Figure 4B:
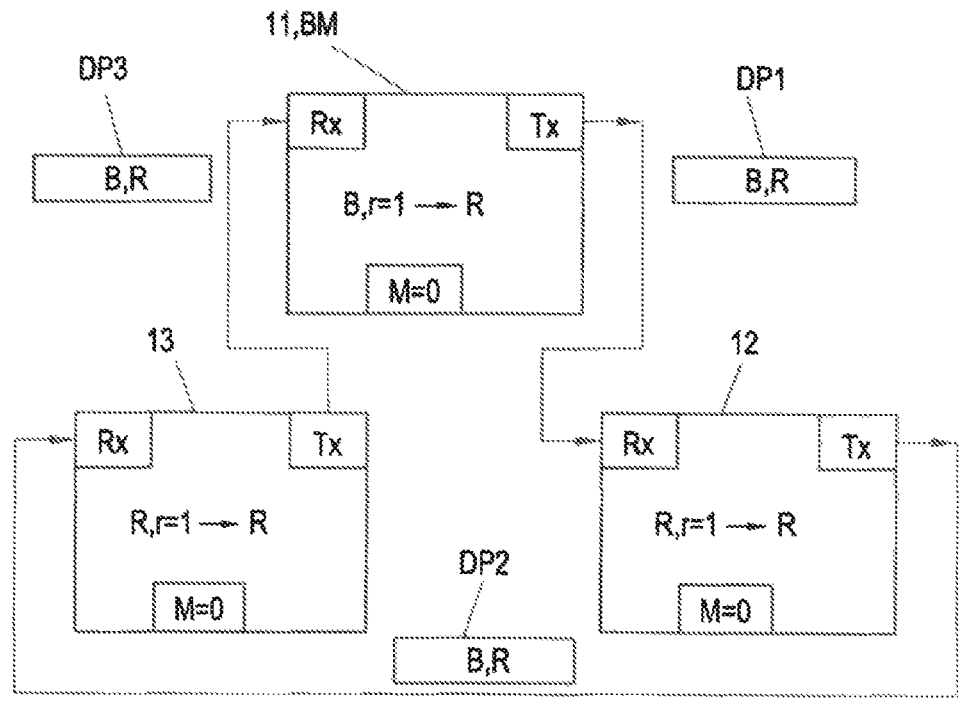
FIG. 4b is a transmission of a ready signal, wherein all safety components have an active ready status.

In contrast, it is assumed in FIG. 4b that all safety components 11, 12, 13 have an active ready status r. Thus, the ready signal R is only routed in the data packet DP1 to the second safety component 12, which, because of its active ready status r, routes the ready signal R in the data packet DP2 to the third safety component 13. Due to its active ready status r, the third safety component 13 routes the ready signal R in the data packet DP3 to the first safety component 11, which constitutes the bus master BM. The bus master BM thus establishes that all safety components 11, 12, 13 have an active ready status r, and thus determines an operational test arrangement. It should be noted that both with an active ready status r (FIG. 4b) and an inactive ready status r (FIG. 4a) of the third safety component 13, the bus master BM receives the bus verification signal B in the data packet DP3, This means that in both cases, the circular test arrangement is closed. If this were not the case, then the bus master BM would not receive any data packet DP3, and therefore no bus verification signal B (and of course no ready signal R, etc.).

Figure 5:
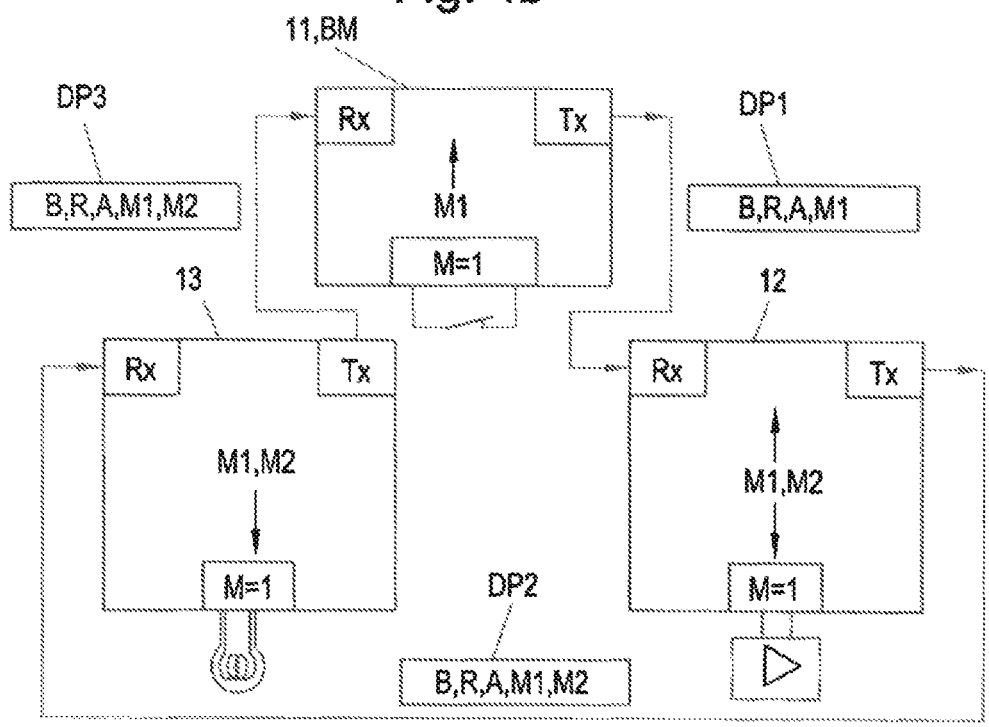
FIG. 5 is a transmission of an activation signal.

FIG. 5 shows the situation in which the bus master BM has already established that the test arrangement is ready for operation, by receiving the ready signal R. The bus master BM therefore transmits an activation signal A to all other safety components 12, 13, i.e, in a data packet DP1 to the adjacent safety component connected in the direction of transmission (in this case, the second safety component 12), which in turn transmits the activation signal A in a data packet DP2 to the adjacent safety component connected in the direction of transmission (in this case, the third safety component 13), etc. The other safety components 12, 13 switch their safety module M to active upon receipt of the activation signal A in the data packet DP, which means that the circular test arrangement is active.

The safety components 11, 12, 13 are only allowed to transmit and receive safety-relevant information M1, M2, M3 if the safety module M is active in each case. In FIG. 5, it is assumed that all safety components 11, 12, 13 have already received an activation signal A/still receive it cyclically.

The first safety component 11 includes an input unit, for example a switch, and due to an activated safety module M, it can add safety-relevant information M1 to the data packet DP1. For example, a measurement start command can be instructed by the first safety component 11 as safety-relevant information M1.

The second safety component 12 comprises a power unit. Since its safety module M is activated, the second safety component 12 can thus read out safety-relevant information M1 from the data packet DP1, as well as add safety-relevant information M2 to the data packet DP2. For example, the second safety component 12 can activate its power unit from the safety-relevant information M1 originating from the first safety component 11 in the form of a measurement start command, and also add safety-relevant information M2 in the form of measured values to the data packet DP2.

The third safety component 13 comprises an output unit which can now output safety-relevant information M1, M2 contained in the data packet DP2, for example safety-relevant information M1 originating from the first safety component 11 with regard to the input unit, such as a measurement start command, or safety-relevant information M2 originating from the second safety component 12 with regard to the power unit, such as a measured value. When the safety module M is activated, the safety components 11, 12, 13 can therefore add safety-relevant information M1, M2, M3 to a data packet DP1, DP2, DP3 and/or read it out of a data packet DP1, DP2, DP3—depending on the design of the safety component 11, 12, 13. The input unit, power unit and output unit are only shown in FIGS. 5 and 6a, since the safety modules M of the safety components 11, 12, 13 are only activated here.

In FIG. 5, as in FIG. 4, the data packets DP1, DP2, DP3 also contain the bus verification signal B and the ready signal R, with the bus master BM continuing to monitor a closed circular test arrangement, as well as an active ready status r of all safety components 11, 12, 13.

The safety components 11, 12, 13 can also carry out a security test S (not shown) and, if the security test fails, deactivate their safety module M and emit an emergency stop signal N in a data packet DP1, DP2, DP3 to the other safety components 11, 12, 13, which, upon receipt of the emergency stop signal N, not only forward it in a data packet DP1, DP2, DP3, but also disable their safety module M. A failed security test S thus immediately leads to a data packet DP1, DP2, DP3 being transmitted with an emergency stop signal N in order to deactivate the safety modules M of all safety components 11, 12, 13. An emergency stop signal N can also be transmitted by the bus master BM if the bus master BM does not receive back the activation signal A that it transmitted at the signal input Rx in a data packet DP3.

In contrast to a safety test S, failure of a function test T (which is not safety-critical) only leads to an inactive ready status r of said safety component 11, 12, 13. This inactive ready status r is only recognized by the bus master BM when it transmits a ready signal R and does not receive it. The other safety components 11, 12, 13 whose function tests T fail can remain in the active ready status r.

Figure 6A:
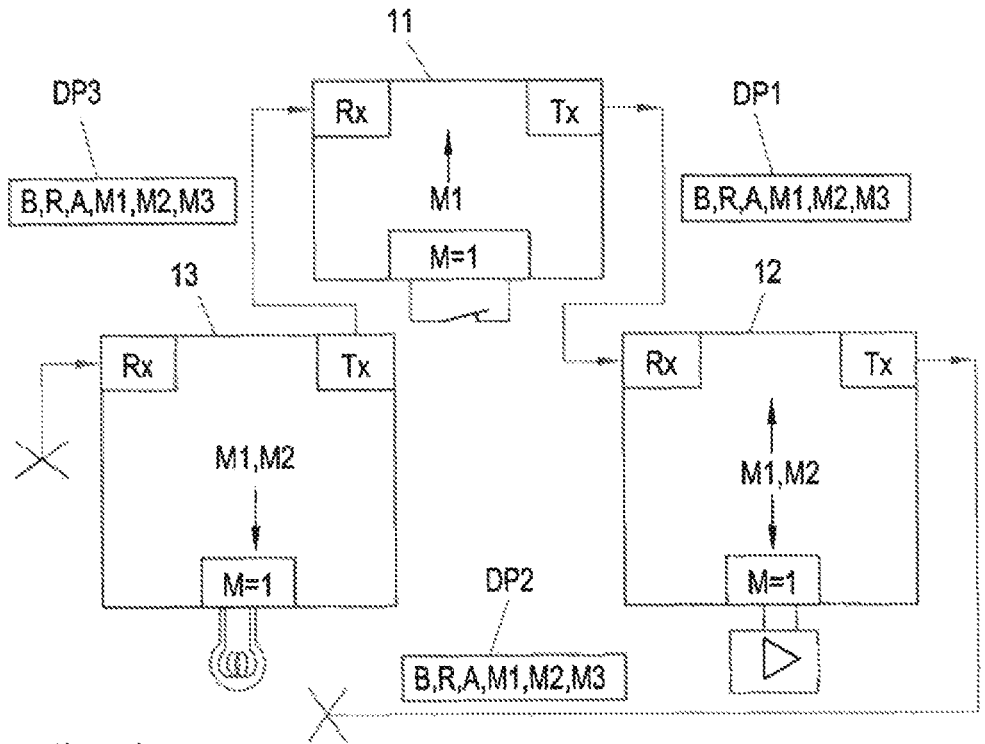
FIG. 6a is a break in the ring.
Figure 6B:
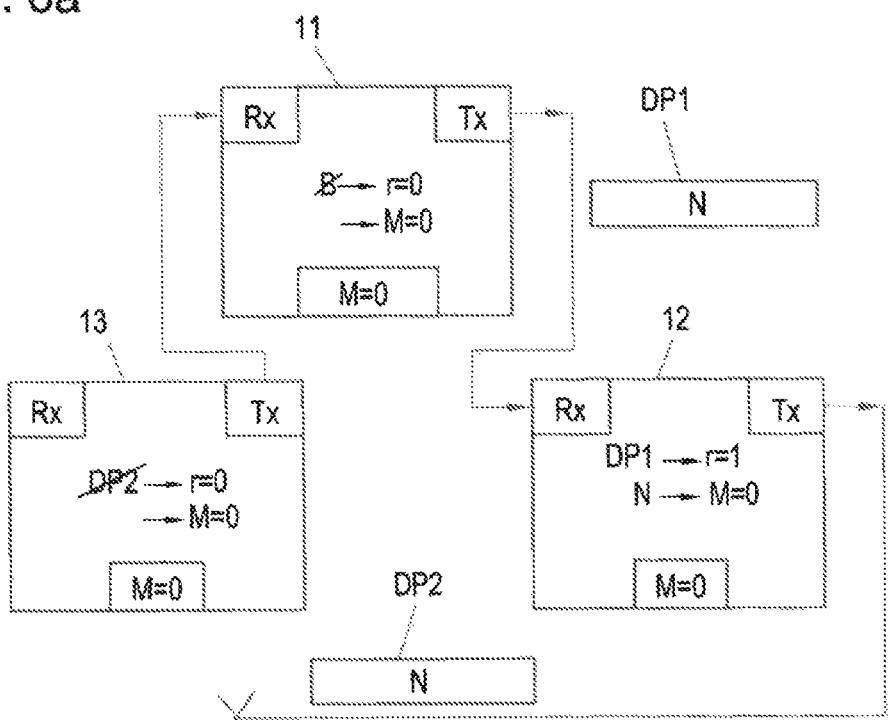
FIG. 6b is a transmission of an emergency stop signal.

A break in the ring is shown in FIGS. 6a, b, i.e., an interruption in the communication line between the second safety component 12 and the third safety component 13. It is assumed that the break in the ring in FIG. 6a occurs after the bus master BM has received the data packet DP3, which means that the bus master BM still has no indication of the break in the ring when the data packet DP1 is sent. The data packet DP1 with the bus verification signal B (and in this case, also a ready signal R, activation signal A, and safety-relevant information M1, M2, M3) thus reaches the second safety component 12, which at this point in time has also not yet detected a break in the ring, and thus transmits a data packet DP2, which, however, does not arrive at the third safety component 13.

The third safety component 13 is configured in this case in such a way that it does not transmit any data packet DP3 if it does not receive any data packet DP2. The cyclic function test T of the bus master BM thus fails, and the bus master BM would deactivate its ready status r. The bus master BM thus sets its ready status r to inactive and transmits a data packet DP with an emergency stop signal N in order to deactivate the safety modules M of all safety components 11, 12, 13. The emergency signal N reaches the second safety component 12 in the data packet DP1, with the result that the safety module M of the second safety component 12 is deactivated.

If the third safety component 13 were configured in such a way that it also transmits a data packet DP3 if it does not receive a data packet DP2 (not shown), the essential function test T of the bus master BM would be successful, with the bus master BM leaving its ready status r active. In this case, it is advantageous if the bus master BM is configured in such a way that it transmits an emergency stop signal N if it does not receive a bus verification signal B. However, the bus master BM would still not receive a bus verification signal B due to the break in the ring, and would therefore transmit an emergency stop signal N in the data packet DP1 if it was configured in this way. In the event of a break in the ring, the bus master BM does not receive a bus verification signal B in any case, and thus determines that the circular test arrangement is no longer closed (FIG. 613).

However, because of the break in the ring, the second safety component 12 cannot transmit the emergency signal N to the third safety component 13 in the data packet DP2. However, the third safety component 13 cyclically carries out at least one essential function test T(DP) and waits for at least one data packet DP2 for the verification. This function test T thus fails, with the result that the third safety module 13 switches its operating status r to inactive, with the result that the safety module M is also switched to inactive.

The first and third safety components 11, 12, 13 thus remain with an inactive safety module M in the test arrangement shown. The second safety component 12 can have an active ready status r, provided that no associated function tests T fail. However, this is only possible if the first safety component 11 is configured in such a way that it transmits a data packet DP even if it does not receive a data packet DP (for example, with a bus verification signal B), since otherwise the essential function test T of the second safety component 12 would fail.

The test arrangement can now, for example, be supplemented in a simple manner by additional safety components between the second safety component 12 and the third safety component 13. Alternatively, a different arrangement of safety components 11, 12, 13 can be made, or the break in the ring can simply be closed.

Only when the break in the ring has been remedied is, as described above, a bus master BM determined, a data packet DP1, DP2, DP3 with a bus verification signal B transmitted to determine a closed circular test arrangement, a data packet DP1, DP2, DP3 with a ready signal R transmitted, and, as long as all safety components 11, 12, 13 have an active ready status r, an activation signal A for activating the safety modules M of the safety components 11, 12, 13 of the test arrangement transmitted. Safety-relevant information M1, M2, M3 can then be exchanged between the safety components 11, 12, 13 again.

The invention claimed is:
1. A method for operating a test arrangement comprising:
a plurality of safety components, each of the plurality of safety components having a signal input for receiving data packets, and a signal output for transmitting data packets, a safety module settable to active or inactive, and a ready status settable to active or inactive,
wherein the safety module of a respective safety component is set to inactive when an associated safety component has an inactive ready status,
wherein the signal inputs and signal outputs of the plurality of safety components are connected in such a way that the plurality of safety components form a circular test arrangement with a direction of transmission for the data packets,
wherein each of the plurality of safety components cyclically carry out a number of function tests and set their ready status to active when the number of function tests is successful and to inactive if at least one of the function tests fails,
wherein one of the function tests is checking for a cyclic, error-free reception of a data packet,
wherein one of the plurality of safety components is selected as the bus master, which cyclically transmits a bus verification signal in a data packet to an adjacent safety component in the direction of transmission, and each of the remaining safety components are configured to forward the bus verification signal in the packet to an adjacent safety component, and wherein the bus master, upon receipt of the bus verification signal in the data packet, determines that the circular test arrangement is closed.

2. The method according to claim 1, wherein the bus master, upon determining that the circular test arrangement is closed, cyclically checks whether its ready status is active and, if when the ready status is active, transmits a ready signal in a data packet to the adjacent safety component, and wherein the plurality of safety components, upon receipt of the ready signal, each check whether their ready status is active, and, if when the ready status is active, transmit a ready signal in a data packet to the adjacent safety component in the direction of transmission.

3. The method according to claim 2, wherein the bus master, upon receipt of the ready signal, determines that the test arrangement is operational, and transmits an activation signal in a data packet to the adjacent safety component in the direction of transmission, wherein the plurality of safety components, upon receipt of an activation signal, each activate their safety module, and forward the activation signal in a data packet.

4. The method according to claim 3, wherein the bus master, after transmitting a ready signal and not receiving a ready signal, transmits an emergency stop signal in a data packet to the adjacent safety component in the direction of transmission, wherein the plurality of safety components each deactivate their safety module upon receipt of the emergency stop signal, and forward the emergency stop signal in a data packet.

5. The method according to claim 1, wherein the bus master, after transmitting the bus verification signal and not receiving a bus verification signal, transmits an emergency stop signal in a data packet to the adjacent safety component in the direction of transmission, wherein the plurality of safety components each deactivate their safety module upon receipt of the emergency stop signal, and forward the emergency stop signal in a data packet.

6. The method according to claim 1, wherein the plurality of safety components carry out a safety test, and when the safety test fails, the respective safety components deactivate their ready status, and transmit an emergency stop signal in a data packet to the adjacent safety component in the direction of transmission, wherein the plurality of safety components deactivate their safety module upon receipt of the emergency stop signal, and transmit the emergency stop signal in a data packet.

7. The method according to claim 1, wherein the bus master is selected via a component identification of the plurality of safety components.

8. The method according to claim 1, wherein the plurality of safety components transmit a component identification with the bus verification signal in the data packet, and wherein the bus master identifies the plurality of safety components by the component identifications received with the bus verification signal.

9. The method according to claim 8, wherein the bus master transmits the component identifications back to the respective safety components in a data packet, and a safety component sets its ready status to inactive if it does not receive its identification back from the bus master.

10. The method according to claim 7, wherein a safety component with the lowest component identification is selected as the bus master.

* * * * *